United States Patent Office 3,452,250
Patented June 24, 1969

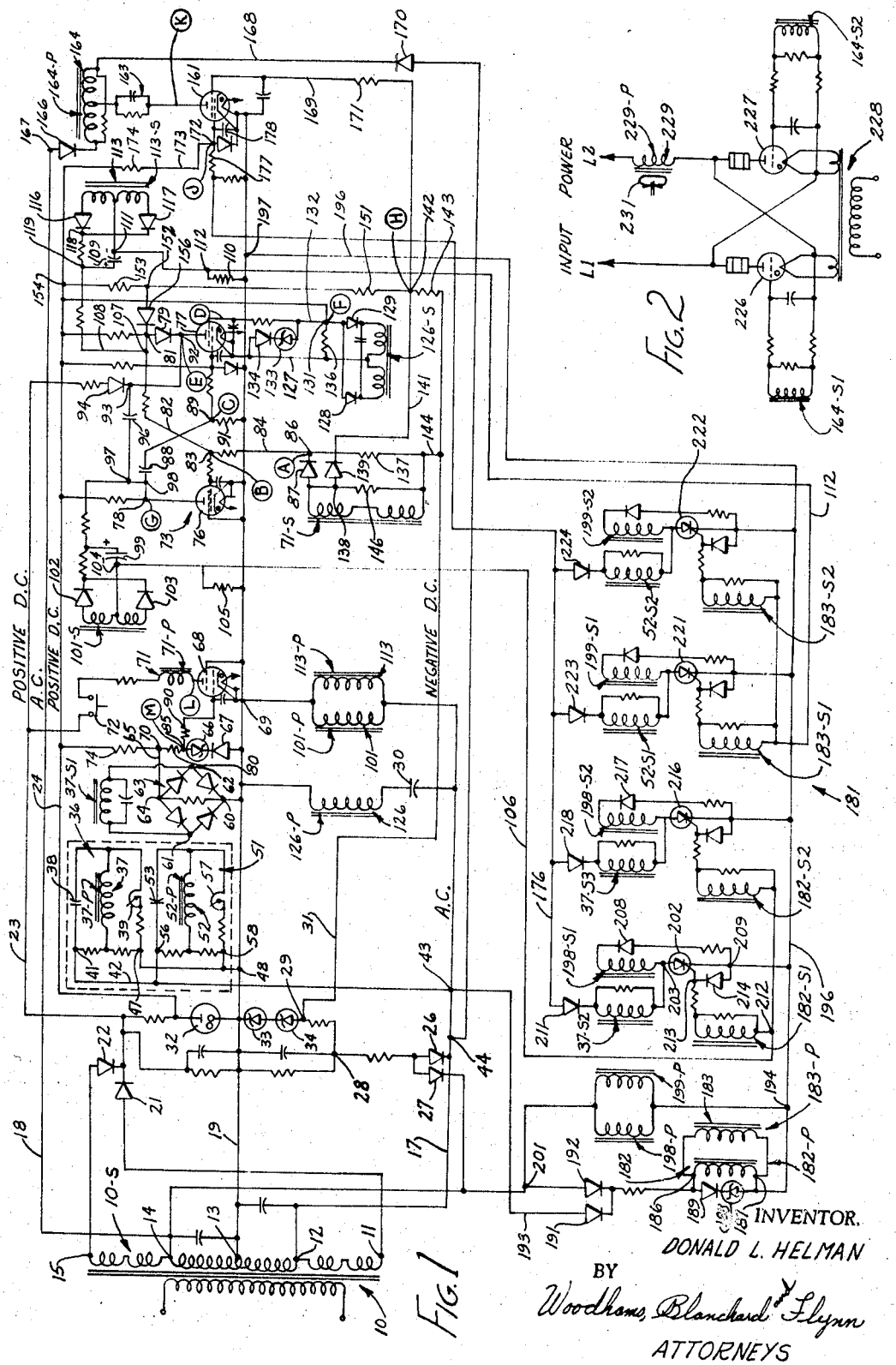

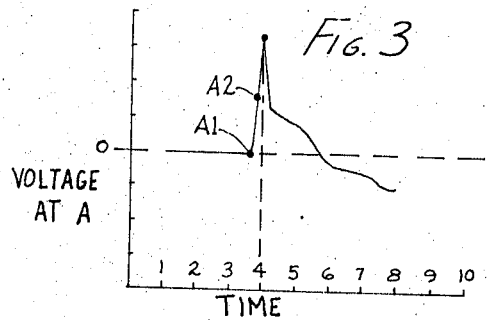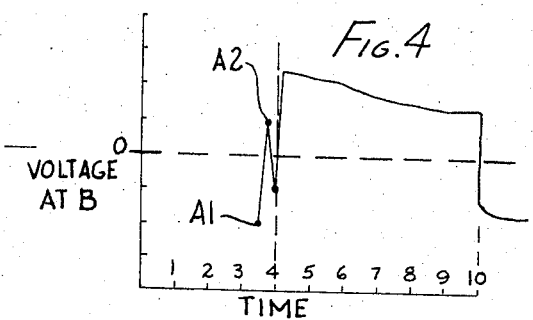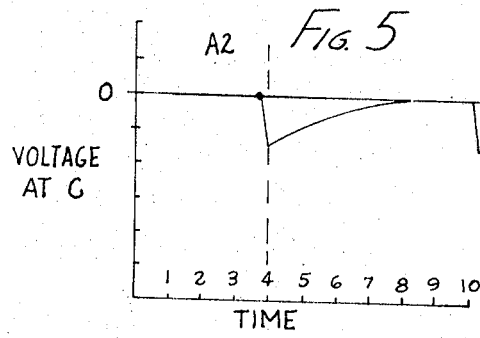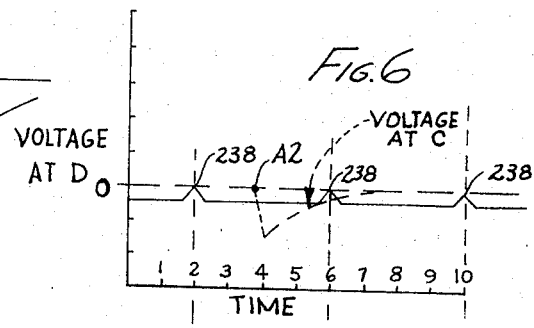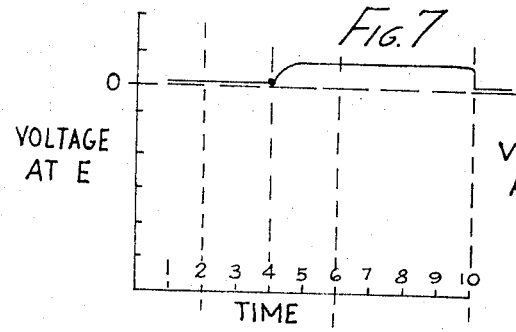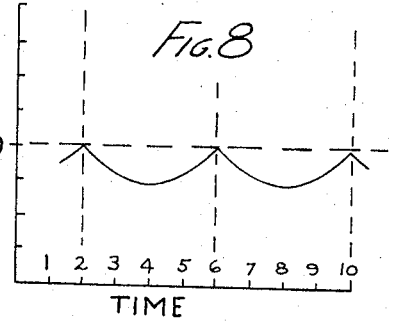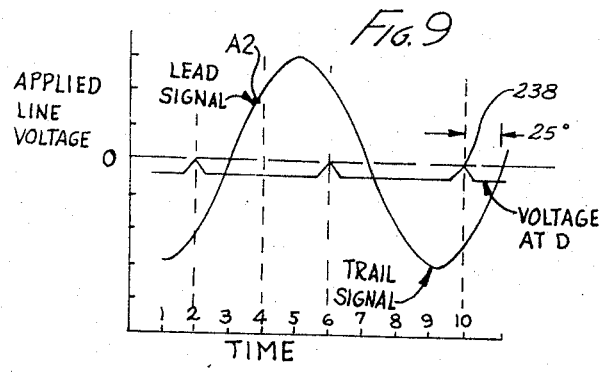

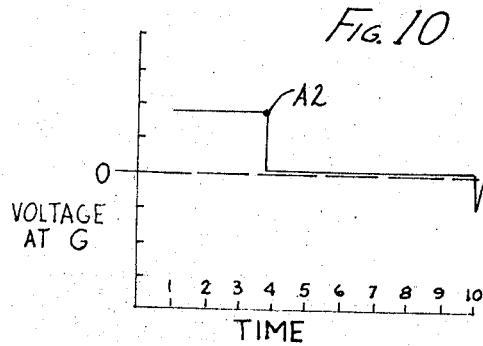
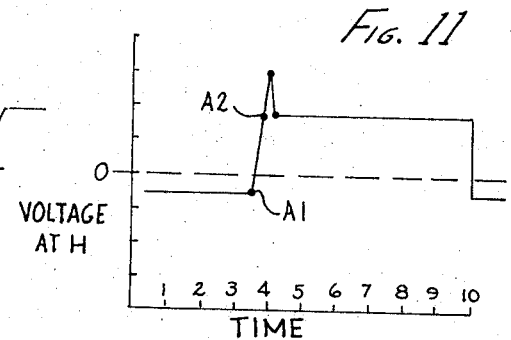
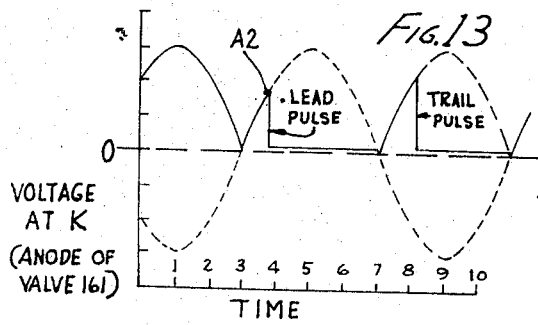
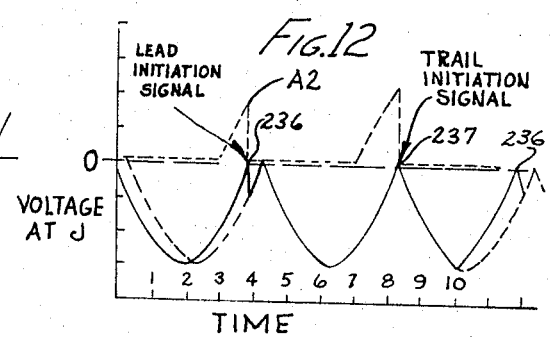
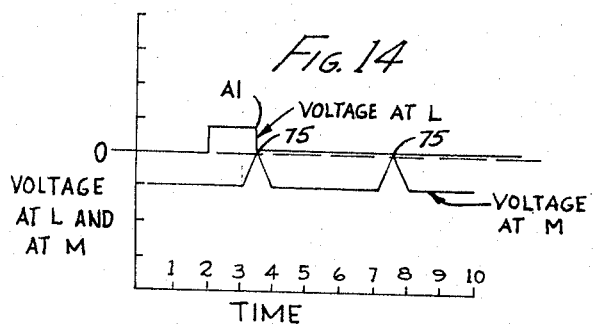

3,452,250
TIMER WITH HALF-CYCLE STARTING FOR CURRENT CONTROL IN WELDING-TYPE SYSTEMS
Donald L. Helman, Farmington, Mich., assignor to Robotron Corporation, Detroit, Mich., a corporation of Michigan
Filed June 27, 1967, Ser. No. 649,238
Int. Cl. H05b 37/02, 39/04
U.S. Cl. 315—197                    12 Claims

ABSTRACT OF THE DISCLOSURE

A timing and heat control circuit for initiating the flow of welding current to a welding transformer having a main switch controlling the welding transformer and having first and second valving means controlling the operation of the main switch. The first valving means applies a signal to one control electrode of said main switch and said second valving means applies a signal to the second control electrode of said main switch. The second valving means further comprises circuitry for regulating the point in time at which the main switch closes during each half-cycle after an initiating switch has been closed.

Field of the invention

This invention relates to timing circuits and particularly to such a circuit primarily intended for controlling the flow of welding current in a resistance welding system.

Description of the prior art

While the circuit hereinafter described has been developed primarily for controlling the flow of welding current as above set forth, it will be recognized that it has a wide range of applicability. Accordingly, its use in connection with a welding circuit will be hereinafter employed for purposes of illustration but same will be recognized as being for illustrative purposes only.

In connection with the control of welding circuits, particularly in the high speed, repetitive, welding of small parts, it has long been desired to provide a circuit effecting a one-cycle weld and also effecting initiation of current flow which will produce a weld starting signal within the same half-cycle as the half-cycle in which the initiating pulse occurs. Heretofore, it has, as far as I am aware, been impossible to start a welding operation fast enough so that it occurs within one-half cycle of the time in which the initiation signal occurs and still have accurate phase shifting for heat control purposes.

It is further desirable in such a circuit that it be immaterial whether the cycle during which initiation of the welding operation occurs is a positive or a negative half-cycle insofar as the main power source is concerned. It is further desirable that the leading half-cycle and trailing half-cycle be separately adjustable with respect to welding heat produced. These objectives are all well known and recognized by the industry. Yet, no one, as far as I am aware, has been able to develop a system for accomplishing these results.

Accordingly, the particular objects of this invention include:

(1) To provide a timing circuit, particularly adaptable for timing a one-cycle welding operation from a commercial A.C. source, for starting a sequence within a half-cycle of timing, from the initiation signal.

(2) To provide a circuit, as aforesaid, in which the half-cycle in which such initiation is effected may be either a positive or a negative half-cycle from the main power source.

(3) To provide a circuit, as aforesaid, in which the heat output of a welder associated therewith from each half-cycle may be independently adjustable with respect to the corresponding adjustment of the one or more half-cycles following thereafter.

(4) To provide a circuit, as aforesaid, which will have a high degree of stability.

(5) To provide a circuit, as aforesaid, which will be free from the necessity for delicate adjustments and will hence be reliable even under conditions of varying loads and varying input voltages.

Other objects and purposes of the invention will become apparent to persons acquainted with this type of apparatus upon reading the following specifications and inspecting the accompanying drawings.

Brief description of the drawings

In the drawings:

FIGURE 1 is a schematic drawing of a welding circuit embodying the invention.

FIGURE 2 is a schematic drawing of the welding electrode portion of the circuit.

FIGURES 3–8 inclusive represent voltage patterns with respect to a ground potential at points A–F inclusive in FIGURE 1.

FIGURE 9 is a voltage pattern of the applied line voltage.

FIGURES 10–14 inclusive represent voltage patterns with respect to a ground potential at points G–K inclusive in FIGURE 1.

Summary of the invention

The objects and purposes of this invention have been met by providing a timing and heat control circuit for initiating the flow of welding current to a welding transformer having a main switch controlling the welding transformer and having first and second valving means controlling the operation of the main switch. The first valving means applies a signal to one control electrode of said main switch and said second valving means applies a signal to the second control electrode of said main switch. The second valving means further comprises circuitry for regulating the point in time at which the main switch closes during each half-cycle after an initiating switch has been closed.

Detailed description

Referring now to the drawings for a detailed illustration of one specific embodiment of the invention, there is shown a main transformer 10 (FIGURE 1) energizable from any convenient external source of alternating potential normally 60 cycle, 110 volts whose secondary winding 10–S has a plurality of terminals 11, 12, 13, 14 and 15. The terminals 12 and 14 energize the A.C. lines 17 and 18, respectively, with respect to the ground line 19 which is connected to the terminal 13. The terminals 11 and 15 are connected through diodes 21 and 22, respectively, for energizing the D.C. lines 23 and 24 with respect to the ground line 19 and terminals 12 and 14 are connected to the diodes 26 and 27, respectively, for acting through the junction points 28 and 29 to energize the D.C. line 31 with respect to the ground line 19. Likewise, voltage control devices as indicated at 32, 33 and 34 are provided for properly regulating the voltage in a known manner on said respective D.C. lines.

The primary windings of the transformers 126–P, 101–P and 113–P are connected between the A.C. line 17 and the ground line 19, the winding 126–P having a capacitor 30 in series therewith for purposes appearing hereinafter.

A first phase shift circuit 36 comprises a transformer primary winding 37–P connected to a capacitor 38 and to a potentiometer 39 in a conventional manner, the junction point 41 being connected by line 42 to junction point 43 on the A.C. line 17, which in turn is energized from the junction point 44 on A.C. line 17. Said primary winding 37–P is also connected at both of its ends to both sides of a potentiometer 39 through a junction point 47 located on one side of said winding. The junction point 47 is connected to junction point 48 on the ground line 19.

A second phase shift circuit 51 is similar to said first circiut and comprises a transformer primary winding 52–P which is connected to a capacitor 53 through a junction point 56 located therebetween and is further connected to line 42 and thence to A.C. line 17 through junction point 43. Said primary winding 52–P is also connected at both of its ends to both sides of a potentiometer 57 through a junction point 58 located on one side of said winding. The junction point 58 is connected to junction point 48 on the ground line 19.

A first secondary winding 37–S1 of the transformer 37 is connected to opposite ends 61 and 62 of a full wave rectifier circuit 63 which may be of any conventional nature. One output terminal 60 of the rectifier circuit 63 is connected to the ground line 19. The other output terminal 64 is connected by conductor 65 to the junction point 70. One side of a dropping resistor 80 is connected to the junction point 70 whereas the other side is connected to junction point 85 (defining point M) and Zenor diode 66 for regulating the voltage differential between the junction point 85 and the ground line. A diode 67 is connected between the Zener 66 and the ground line 19 to protect the circuit against reverse pulses appearing on the ground line. Junction point 85 is also connected through a leakage resistor 90 to the control grid of an electric discharge valve 68, here a thyratron. The junction point 70 is connected through a high resistance 74 to the D.C. line 24.

The cathode of the thyratron or valve 68 is connected to a junction point 69 on the ground line 19 and the anode (defining point L) in connected through a primary winding 71–P of the transformer 71, through an initiating switch 72 to the D.C. line 23. It is recognized, of course, that the initiating switch 72 may be of any conventional sort. Particularly, it may be manual, mechanical or another electronic circuit. The screen grid of said valve is connected to the ground line 19.

A bistable, flip-flop, circuit 73 is comprised of valves 76 and 77, here thyratrons, together with associated circuitry. The cathode and shield grid of valve 76 are connected in a conventional manner to the ground line 19. The anode thereof is connected to the junction point 78 (defining point G) and thence to D.C. line 24.

The valve 77 is similarly connected by its cathode and shield grid to the ground line 19 and by its anode through a diode 79 and the junction point 81 to the D.C. line 24. The junction point 81 is connected by a line 82 to a junction point 83 (defining point B) which in turn is connected to the control grid of the valve 76. The junction point 83 is further connected by a line 84 to a junction point 86 (defining point A) which is then connected through a diode 87 to one end of the secondary winding 71–S of the transformer 71. The junction point 78 in the anode circuit of valve 76 is connected through a capacitor 88 to a junction point 89 (defining point C) and thence to the control grid of the valve 77. The junction point 89 is further connected through a resistor 91 to the ground line 19.

A junction point 92 (defining point E) in the anode circuit of the valve 77 is connected through a junction point 93 thence through a diode 94 to the D.C. line 23. The junction point 93 is connected through a capacitor 96 to a junction point 97. A junction point 98, connected to the junction point 78, is connected through the junction point 97 to the capacitor 99 and thence to a center-tap on the secondary winding 101–S of the transformer 101. The end taps of said secondary winding 101–S are connected through the diodes 102 and 103 to the junction point 98 on one side of the capacitor 99. A junction point 104 on the other side of said capacitor 99 is connected through the line 106 to further circuitry which will be separately described hereinafter and through a resistor 105 to the ground line 19.

Similarly the junction point 81 in the anode circuit of valve 77 is connected through a junction point 107 and thence through a line 108 to one side of the capacitor 109. The other side of said capacitor is connected through a junction point 111 and line 112 to further circuitry which will be separately described hereinafter and through a resistor 110 to the ground line 19. The secondary winding 113–S of the transformer 113 is connected from its center-tap to the junction point 111. Opposite ends thereof are connected through diodes 116 and 117 to a junction point 118 which is further connected to a junction point 119 between the capacitor 109 and the junction point 107.

The secondary winding 126–S of the transformer 126 is connected by its center-tap through a line 127 to the ground line 19 and by its end taps through the diodes 128 and 129 to a junction point 131 (defining point F) which is in turn connected through a line 132 to the screen grid (defining point D) of the valve 77. A Zener diode 133 and the diode 134 are connected in series with each other and between the lines 127 and 132. A resistor 136 or relatively high value is connected also between the lines 127 and 132.

The secondary winding 71–S of the transformer 71 is connected by one of its end taps through a diode 87 to the junction point 86 above mentioned, its other end tap being connected through a resistor 137 to said junction point 86. A further junction point 138 is connected to the first-mentioned end tap through a diode 139 to a line 141 and the junction point 142, (defining point H). The junction point 142 is connected through a resistor 143 to the negative D.C. line 31. The second above-mentioned end tap of the secondary winding 71–S is also connected through the line 144 to said D.C. negative line 31. A resistor 146 of relatively high value is also connected between the last-mentioned end tap of the secondary winding 71–S and the junction point 138.

The junction point 142 is connected through a resistor 151 to a junction point 152 which is in turn connected through a further resistor 153 to a junction point 154 on the positive D.C. line 24. The junction point 152 is connected through the diode 156 to the junction point 81.

A further electric discharge valve 161, here also a thyratron constitutes the main switch of the timing mechanism and its output is utilized to control the conventional switching gear for a welding circuit or, if preferred, other load means. Its cathode is connected to the ground line 19 and its anode (defining point K) is connected through a low capacitor resistance circuit 163 to the center-tap of the primary winding 164–P of the transformer 164. One end of said transformer is connected through a diode 166 to a junction point 167 on the A.C. line 18 while the other end of said primary winding is connected by the line 168 through a diode 170 to the A.C. line 17. The screen grid of the valve 161 is connected by a line 169 through a resistance 171 of relatively high value to the junction point 142. The control grid of the valve 161 is connected to a junction point 172 which is in turn connected by a line 173 through a resistance 174 of high value to the positive D.C. line 24. The junction point 172 (defining point J) is further connected through a resistor 177 and line 176 to valving circuitry hereinafter further described. The control grid further has a capacitor 178 secured thereto and the cathode of said valve 161.

Turning now to the valving circuitry indicated generally by the numeral 181, reference may be first made to the primary windings 182–P and 183–P of the transformers 182 and 183, respectively, which windings are connected in parallel with each other to junction points 186 and 187 located on oppoesite sides of a Zener diode 188 and a diode 189. The junction point 186 is then connected through diode 192 and junction winding 37–S3 is wound with respect to the primary winding 37–P of transformer 37 and oppositely of the second secondary windings 37–S1 and 37–S2 thereof. Thus, regardless of the direction in which a pulse is applied to the primary winding of the transformer 37, the pulses delivered by the secondary windings 37–S2 and 37–S3 are in opposite directions so that at least one of the windings produces a signal in the right direction to pass through one of the diodes 211 and 218. The gates of the SCR's 202 and 216 are connected through line 106 to the junction point 104 and capacitor 99 above described.

The further components of the valving circuitry 181 include the SCR's 221 and 222 which are connected identically as the SCR's 202 and 216 above described in detail excepting that here the gates of the SCR's 221 and 222 are connected to the line 112 which is connected to the junction point 111 and the capacitor 109 above described. The cathodes of said SCR's 221 and 222 are connected to the line 196 in the same manner as the cathodes of the previously described SCR's 202 and 216. The output ends of the secondary windings 52–S1 and 52–S2 of the transformer 52 are similarly connected through diodes 223 and 224, respectively, to the line 176. Likewise, as with the secondary windings 37–S2 and 37–S3, the secondary winding 52–S2 is wound with respect to the primary winding 52–P and oppositely of the winding 52–S1 so that a pulse appearing on said primary winding will produce an output in the secondary windings in opposite directions with respect to each other so that at least one pulse will be in the right direction to pass through one of the diodes 223 and 224.

In the portion of the circuit illustrated in FIGURE 2, the secondary windings 164–S1 and 164–S2 are connected in a conventional manner to the control electrode of the thyratrons 226 and 227, respectively. The cathode filaments of the thyratrons are connected from the secondary winding of the main power transformer 228, which may be the same transformer as the transformer 10. The anodes of the thyratrons are connected through the primary windings 229–P of a conventional welding transformer 229 to the welding electrodes, indicated at 231.

*Operation*

Considering first the condition prior to initiating a welding operation:

The secondary winding 10–S of the transformer 10 energizes the A.C. bus lines 17 and 18 from its secondary terminals 12 and 14. The secondary winding 10–S of said transformer also provides, from its terminals 11 and 15, the diodes 21 and 22 with a suitable potential from which there is supplied a D.C. voltage on D.C. bus lines 23 and 24 both of which are positive with respect to the D.C. ground line 19. Such voltage is suitably regulated by the voltage regulator valve 32. Similarly, said secondary winding 10–S provides, from the center-tap 13 and the terminals 12 and 14 and through the diodes 26 and 27, a negative D.C. voltage on the bus line 31. This voltage is regulated by the Zener diodes 33 and 34.

Transformers 37 and 52 are energized through their primary windings by being connected at the corresponding rightward ends through line 42 and junction point 43 and thence to temrinal 12 of secondary winding 10–S and the respective leftward ends of the secondary windings being connected through junction point 48 to the center-tap 13 of said transformer 10–S.

The pulses appearing on the secondary winding 37–S1 are rectified by the rectifying circuit 63 and clipped (voltage at M) by the Zener diode 66 so that positive, equally spaced, pulses 75 (FIGURE 14) are applied through the conductor 65 and junction point 85 to the grid of the valve 68. The pulses 75 are slightly positive due to the D.C. potential from line 24 applied to junction point 70.

The transformers 37 and 52 are related to what will be hereinafter referred to as the "lead" and "trail" half-cycles (FIGURE 9), respectively. That is, the lead half-cycle is that half cycle that appears on the primary winding 37–P at the time the initiation switch 72 is closed or the next following half-cycle depending on where in the half-cycle the initation switch 72 is closed. The trail half-cycle is that half-cycle appearing on the primary winding 52–P after the lead half-cycle has terminated. More specifically, the trail half-cycle is the next half-cycle of power applied to the phase shift circuit 51. It is to be understood that the lead signal can be either positive or negative.

Transformers 101, 113 and 126 are all energized through their primary windings from bus lines 17 and 19 which are in turn energized as set forth above. Transformers 198 and 199 are energized from junction points 194 and 201 which in turn are energized from the terminals 14 and 13, respectively, of the secondary winding 10–S.

The transformers 182 and 183 are energized by unidirectional pulses applied thereto through the diodes 191 and 192 which are in turn energized by the A.C. potential developed between the terminals 12 and 13, 13 and 14, of the secondary winding 10–S. Similarly, transformers 198 and 199 are energized by the A.C. patential applied across the junction points 194 and 201, said potential originating from the terminals 13 and 14 on the secondary winding 10–S.

The pulsing signals from the secondary windings 182–S1 and 182–S2 in the gate circuitry of the SCR's 202 and 216 intermittently bias said SCR's toward the conducting state. Whether or not such bias will accomplish such conducting state depends upon whether or not a negative blocking voltage exists on said gates from the capacitor 99 as hereinafter further explained. Before the initiation switch 72 is closed, however, the SCR's 202 and 216 are turned on so that equally spaced positive pulses 236 (FIGURE 12) are applied to the control grid of the valve 161 through one of the diodes 211 and 218. The pulses illustrated in FIGURE 12 have been phase shifted slightly due to the resistor 177 and capacitor 178. Thus, the pulses 236 and 237 will not occur at the same point in time as the pulses 75 (FIGURE 14) even though they come from the same transformer primary 37–P. The fact that the pulses 236 are slightly positive is due to the D.C. potential from the line 24 on the line 173 secured to the junction point 172. The secondary winding 198–S1 and 198–S2 of the transformer 198 supply a load voltage to the SCR's 202 and 216 to hold said SCR's in the conducting state when the potential on the control electrodes permit it.

Likewise, the secondary winding 52–S1 and 52–S2 are, as stated above, oppositely wound with respect to each other for the same reason, that is, to switch the valve 161 to a conductive state during the trail half-cycle.

Similarly, the pulsing signals from the secondary windings 183–S1 and 183–S2 in the gate circuitry of the SCR's 221 and 222 intermittently bias said SCR's toward the conducting state. Whether or not such bias will accomplish such conducting state depends upon whether or not a negative blocking voltage exists on said gates from the capacitor as hereinafter further explained. Before the initiation switch 72 is closed, SCR's 221 and 222 are biased toward a nonconducting state. The secondary windings 199–S1 and 199–S2 supply a load voltage to the SCR's 221 and 222 to hold said SCR's in the conducting state when the potential on the control electrodes permit it.

The secondary windings of the transformers 101 and 113 charge the capacitors 99 and 109, respectively. Further, the full wave pulse appearing on the secondary winding 101–S is rectified by the diodes 102 and 103 so that a positive D.C. potential is applied to junction point 97 and capacitors 88 and 96. Similarly, a full wave pulse applied to the secondary winding 113–S is rectified by the diodes 116 and 117 to apply a D.C. potential to junction point 107 as well as capacitor 109.

The secondary windings 37–S2 and 37–S3 are, as stated above, oppositely wound so that no matter what direction the pulse is applied to the primary winding 37–P, that is, positive or negative, a pulse will pass through one of the diodes 211 or 218 and appear in the right direction to properly bias the control grid of the valve 161. The overall effect of the pulses applied to the control grid of the valve 161 from the secondary windings 37–S2 and 37–S3 is to switch the valve 161 to a conductive state during the lead half-cycle when a signal is simultaneously applied to the screen grid through the line 161 discussed hereinbelow. To separate, simultaneously applied signals, one applied to the control grid and the other applied to the screen grid, are required in order to turn the valve 161 on.

Now considering the initiation of a welding operation:

The lead cycle is started by closing of the initiation switch 72. This places a D.C. potential onto the anode of thyratron 68 (FIGURE 14) which latter becomes conductive when, but only when, a positive pulse 75 appears on its grid. The point at which the valve 68 will conduct is regulated by the phase shift circuit 36. That is, the valve 68 will not conduct until a positive pulse 75 has been applied to the control grid thereof, the position of said positive pulse being adjustable relative to the time line by the potentiometer 39. Thus, and as stated above, a closing of the initiation switch 72 (at time 2 in FIGURE 14) will result in a positive potential being applied to the anode so that when a pulse 75 is applied to the control grid thereof, valve 68 will conduct at A1. It will continue to conduct as long as the initiation switch 72 remains closed. This conduction provides a momentary positive pulse which appears in the primary winding 71–P of the transformer 71.

Simultaneous with the signal appearing on the secondary winding 37–S1, a lead signal appears on the oppositely wound secondary windings 37–S2 and 37–S3 the positions of which are also adjustable relative to the time line by the potentiometer 39. If it is assumed that the lead signal is positive (FIGURE 9) and that the winding 37–S2 produces a positive pulse 236 (FIGURE 12) with respect to the valve 161, a positive pulse 236 will be applied to the control grid of the valve 161 through the diode 211 and the conductor 176. (If the lead signal were negative, it would appear positive on the winding 37–S3 and positive with respect to the valve 161. As a result, diode 218 would close so that a positive pulse would be applied to the grid of the valve 161 through the conductor 176.) This signal on the grid of valve 161 cooperates with, or supplements, the signal hereinafter described to assure starting of the valve 161 at an exactly prechosen time and independent of transients.

The positive pulse appearing in the secondary winding 71–S (FIGURE 3) from the transformer primary 71–P causes a positive pulse to be applied to the control grid of the valve 76 (FIGURE 4) through the diode 87, junction point 86 and line 84 to turn the normally nonconductive valve 76 on (point A2 in FIGURE 10). This causes the capacitor 96 then to drive the anode of the valve 77 to cut off and render same nonconductive. Simultaneously, the pulse at A2 closes the diode 139 and raises the potential at junction points 92 (FIGURE 7) and 107 and in turn raises the potential at point H (FIGURE 11) and the screen grid of the valve 161. This positive potential along with the positive pulse 236 (FIGURE 12) applied to the control grid from the valving circuitry 181 discussed hereinabove, as well as the potential on the anode of the valve 161, renders the valve 161 conductive.

This starts the lead half-cycle conduction of valve 161 (FIGURES 9 and 13), said conduction starting at A2 (FIGURE 13) and continuing to the end of the lead half-cycle (at time 7, FIGURES 9 and 13). At the transition point from the lead half-cycle to the trail half-cycle (FIGURE 9), the anode potential on the valve 161 returns to zero. Thus, the valve 161 ceases to conduct. At time 6 in FIGURE 6 (also FIGURE 9), a positive going pulse 238 occurs on the screen grid of the valve 77. Since the control grid voltage (FIGURES 5 and 6) thereof is still negative due to the negative pulse applied thereto from the capacitor 88 and the low time constant of resistor 91 and capacitor 88, the valve 77 will not be rendered conductive at this time.

When the valve 76 is rendered conductive at A2, the anode potential indicated at A2 in FIGURE 10 drops off very rapidly causing the capacitor 99 to discharge through valve 76 which causes a negative potential to appear across resistor 105 and to drive the control electrodes of the SCR's 202 and 216 to cut off. However, when valve 77 is rendered nonconductive, the negative potential on capacitor 109 is not applied to resistor 110 and the SCR's 221 and 222 are intermittently rendered conductive. Thus, the pulses 237 (FIGURE 12) on the control grid of the valve 161 then become dependent upon the trail secondary windings 52–S1 and 52–S2 which are phase shifted by the potentiometer 57 in the second phase shift circuit 51. The switch from the pulses 236 under the control of the lead phase shift circuit 36 to the pulses 237 under the control of the phase shift circuit 51 is illustrated in FIGURE 12 in solid lines.

The pulses 237 are generated in the firing circuit 181 by one of the SCR's 221 and 222 becoming conductive due to the fact that valve 77 has been rendered nonconductive and the fact that the negative blocking potential of capacitor 109 is no longer applied (as it was when valve 77 was conducting) to overcome the pulsed positive bias applied to the gates of the SCR's 221 and 222 by the secondary windings 183–S1 and 183–S2. Which of the SCR's 221 and 222 becomes conductive depends on the polarity of the A.C. supply line at the moment the valve 77 is turned off.

Since the trail signal is phase shifted by a separate potentiometer 57, the trail signal can have a different phase relationship than the lead signal so that a separate heat control exists for the lead and trail signals.

Now considering the trail half-cycle:

The signal on the screen grid of valve 161, however, remains positive during the transition from the lead signal to the trail signal as indicated in FIGURE 11. Therefore, the potentials on the anodes of the valves 76 and 77 do not change to reverse the order of conduction during the transition. In other words, the valve 76 remains conductive and the valve 77 remains nonconductive.

The valve 161 is caused to fire during the trail half-cycle due to the positive pulse 237 (FIGURE 12) from one of trail secondary windings 52–S1 and 52–S2 appearing on the control grid thereof. The point at which the valve 161 becomes conductive is determined by the phase control potentiometer 57 in the trail phase shift circuit 51.

The capacitor 30 in the conductor between the primary winding 126–P and the line 17 causes a phase shift of approximately 25 degrees as shown in FIGURE 9 to occur so that the positive going signal in the secondary winding 126–S occurs slightly before the next half-cycle would appear. All that is desired from the circuit in the first place is a lead and a trail regulated pulse out of the valve 161 (FIGURE 13). Once that enough time has elapsed to assure the development of a trail pulse due to the trail pulse 237 (FIGURE 12) applied to the control grid of the valve 161 from one of the secondary windings 52–S1 and 52–S2 in the circuits of one of the conducting SCR's 221 and 222, the positive going signal appearing in the secondary winding 126–S allows the valve 77 to conduct again thereby preventing valve 161 from conducting further after the trail half-cycle is completed. More particularly, the full wave signal is rectified by the diodes 128 and 129 to obtain the signal illustrated in FIGURE 8 across the resistor 136. The peaks of these rectified signals are cut off by the Zener diode 133 to obtain pulses 238 illustrated in FIGURES 6 and 9 which is applied to the screen grid of the valve 77. The pulse 238 occurring at time 10 causes the screen grid of the valve 77 to swing above the cut-off point (FIGURE 6) to permit same to conduct. The voltage on the control grid is zero at this time (FIGURE 5) so conduction will result. Thus, valve 77 is caused to conduct resulting in the potential at junction point 92 and 107 (FIGURE 7) to drop which in turn causes the potential on the screen grid of the valve 161 (FIGURE 11) to go neagtive to hold said valve nonconductive. Valve 76 is rendered nonconductive due to the potential applied to the anode being driven negative (FIGURE 10) through capacitor 96 caused by said drop in potential at the anode of the valve 77. This results in the valve 161 becoming nonconductive prior to the start of the next half-cycle. Since a certain amount of time is required for the valve 161 to become nonconductive, the phase shift caused by capacitor 30 assures that the valve 161 will be turned off in time and will no longer turn on while the switch 72 is closed due to the negative potential on the screen grid.

As a result of valve 77 becoming conductive, the potential of capacitor 109 causes the SCR's 221 and 222 to be biased into the nonconducting state. The potential of capacitor 99 is now applied as the bias on the SCR's 202 and 216, due to the nonconduction of valve 76 so that said SCR's become intermittently conductive again. Thus, the cycle is ready to start again.

It will be recognized from a consideration of the foregoing descriptions that the entire sequence above described will take place immediately upon the closing of the initiating switch 72. That is, the flow of welding current through the welding electrodes will start, subject to the heat control provided by the lead phase shift potentiometer 39, within a half-cycle of time (that is, 180°) of the point at which said initiating switch 72 is closed. In other words, a phase shifted pulse from the firing circuit 181 which is dependent upon the setting of the weld heat control potentiometer 39 applied to the control grid and the pulse applied to the screen grid through the action of the flip-flop 73 will accurately effect initiation of welding current flow precisely at the desired point in the half-cycle in question and this will occur regardless of the direction of current flow through the input transformer 10, namely, regardless of whether the initiating switch 72 is closed in a positive or negative half-cycle of the power supply. The next half-cycle or trail half-cycle will be controlled by a separate weld heat control potentiometer 57 so that the welding current flow may be precisely controlled during the trailing cycle.

There is but one pulse from the primary winding 71–P for any one closure of the initiation switch 72 because said winding 71–P and valve 68 are connected to the D.C. line 23. Once the valve 68 conducts, it will remain conducting steady state until the switch 72 is opened. Thus, only one positive pulse is obtained from the winding 71–3 for each closure of switch 72 no matter how long said switch is closed.

If the initiation switch 72 is closed after a pulse 75 (at time 3.5 in FIGURE 14) has occurred, the welding operation will not start until the next positive pulse (at time 7.5 in FIGURE 14) appears on the control grid of the valve 68. After the valve 68 begins to conduct, only one full cycle of operation is achieved and then the circuit is dormant until the switch 72 is opened and closed again.

Further, it is to be noted that the lead pulse (FIGURE 13) and the trail pulse from the valve 161 are rendered conductive at different points with respect to a half-cycle due to the variance in the setting of the potentiometers 39 and 57. The settings on the potentiometer, if desired, may be selected so that both lead and trail pulses are of the same duration. However, it is recognized that if it were permanently desired to have equal phasing of the lead and trail half-cycles, then a duplicate circuit of the rectifier 63 and associated circuitry could be used to apply pulses to the control grid of the valve 161. There would in such case no longer be any need for a firing circuit 181.

Although a particular preferred embodiment of the invention has been disclosed above for illustrative purposes, it will be understood that variations or modifications of the disclosed apparatus, including the rearrangement of parts, lie within the scope of the present invention.

The embodiments of the invention in which an exclusive property or privilege is claimed are defined as follows:

1. In timing and heat control circuitry for starting a welding cycle by initiating the flow of welding current to a welding transformer, the combination comprising:
   electronic valving means connected to said welding transformer;
   energy source means connected to said electronic valving means for applying successive half-cycle unidirectional pulses thereto;
   blocking means connected to said electronic valving means for applying a blocking potential onto said electronic valving means to hold same normally nonconductive;
   initiation means for initiating the start of said welding cycle;
   starting means responsive to said initiation means for changing said blocking potential on said electronic valving means at selected points in a plurality of said successive unidirectional pulses to place said electronics valving means in a condition for conduction within one half-cycle of a single applied unidirectional pulse measuring and from the time of an initiation of said welding cycle; and
   valving means responsive to said starting means for effecting a conduction of said electronic valving means within one half-cycle of applied unidirectional power measuring from the time of an initiation of said welding cycle.

2. The circuit defined in claim 1, wherein said valving means applies a series of spaced, unidirectional, blocking pulses, to the control grid of said electronic valving means, and wherein said blocking means applies a blocking potential to the screen grid of said electronic valving means to normally hold said electronic valving means nonconductive;
   wherein said starting means effects a removal of said blocking potential from said screen grid; and
   including time adjustable means for adjusting the termination point of said blocking pulses applied by said valving means at a preselected time;
   whereby said electronic valving means is rendered conductive upon the removal of said blocking potential from said screen grid and the termination of said blocking pulses on said control grid at said adjustable termination point.

3. The circuit defined in claim 2, further comprising two independent and adjustable phase shift circuits and a bistable circuit, said bistable circuit being responsive to said starting means for effecting a change of said bistable circuit between first and second conditions, said valving means being responsive to the condition of said bistable circuit and to said to the phase shift circuits, said bistable circuit, when in a first condition, connecting one of said phase shift circuits through said valving means to said control grid and, when in a second condition, connecting the other of said phase shift circuits through said valving means to said control grid for controlling the point in time of occurrence of said blocking pulses to effect a precise control over the point in time when said electronic valving means is rendered conductive, biasing means for normally holding said bistable circuit in said first condition and for automatically shifting same to said second condition when said starting means removes said blocking potential from said screen grid and means for automatically returning said bistable circuit to said one condition at the completion of the predetermine number of said plurality of successive unidirectional pulses.

4. The circuit defined in claim 2 wherein said starting means terminates said blocking pulses at a selected point in each of a pair of successive unidirectional pulses.

5. An electronic timing circuit, primarily for controlling the sequencing of a resistance welding machine, comprising:
  a cyclical energy source;
  a load to be welded;
  a normally nonconductive first switching means for controlling the supply of cyclical energy from said cyclical energy source to said load;
  first and second adjustable phase shift circuits energized by said energy source;
  normally nonconductive starting means connected to said first switching means;
  an initiation switch for placing said starting means in a conductive condition upon an actuation thereof;
  second switching means connected to said starting means and energizable between a first condition and second condition upon said starting means being rendered conductive;
  biasing means for normally holding said starting means nonconductive, said biasing means being energizable solely from said first phase shift circuit for changing said biasing means to bias said starting means conductive at a point in time determined by said first phase shift circuit and within one half-cycle of said cyclical energy and simultaneously therewith shifting said second switching means from said first condition to said second condition;
  pulse producing valving circuits connected to and controlled by said first and second phase shift circuits, said valving circuits being connected to said first switching means and responsive to the condition said second switching means to connect the appropriate ones of said pulse producing valving circuits to said first switching means, said pulses produced by said appropriate ones of said valving circuits being adjustable in time by one of said first and second phase shift circuits to control the point in time when said first switching means conducts;
  whereby conduction of said starting means in response to an actuation of said initiation switch and the simultaneous response of said valving circuits to said conditions of said second switching means renders said first switching means conductive at a point in the applied power cycle of said cyclical energy source as determined by said first phase shift circuit and whereby at the end of one half-cycle of power from said cyclical energy source, the response of said valving circuits to said conditions of said second switching means renders said first switching means conductive in a half cycle immediately following said one half-cycle and in response to the setting of said second phase shift circuit; and
  means for returning said second switching means to said first condition at the end of said immediately following one half-cycle to render said first switching means conductive.

6. The circuit according to claim 5, wherein said starting means comprises a first electronic discharge device in series with said initiation switch; and
  wherein said second switching means comprises a bistable circuit having second and third electronic discharge devices and means holding said second electronic discharge device normally nonconductive and said third electronic discharge device normally conductive.

7. The device defined in claim 6, including a rectifier connected between said first phase shift circuit and said first electronic discharge device to apply a pulse for effecting conduction of said first electronic discharge device at the point in a cycle determined by said first phase shift circuit but regardless of whether said initiation switch has been actuated in a positive or negative half-cycle of the applied power from said energy source; and
  including duplicate circuit paths in said valving circuits connected to said first switching means, said valving circuits producing pulses capable of rendering said first switching means conductive and doing so regardless of the direction of the pulse emanating at a given time from said energy source.

8. The device defined in claim 6, wherein said first switching means has at least one control electrode;
  wherein said pulse producing valving circuits comprise at least four units, the output of each thereof being connected to said control grid, each of said units comprising an electronic valve having main electrodes and a control electrode, a first transformer secondary winding connected in series with said main electrodes of each of said valves and a second transformer secondary winding in series with each of said control electrodes;
  first and second electronic valves of said four units having said first transformer primary winding in said first phase shift circuit, third and fourth electronic valves of said four units having said first transformer primary winding in said second phase shift circuit;
  whereby when said first and second electronic valves are rendered nonconductive by said second switching means, said third and fourth electronic valves conduct permitting said second phase shift circuit to control the closing of said first switching means and when said third and fourth electronic valves are rendered nonconductive, said first and second electronic valves conduct permitting said first phase shift circuit to control the closing of said first switching means.

9. An electronic timing circuit primarily for initiating the flow of welding current to a welding transformer, comprising:
  electronic valving means controllably related to said welding transformer for controlling the flow of current thereto;
  an initiating switch;
  cyclical energy source means connected to the principal electrodes of said electronic valving means for applying cyclical potential to said principal electrodes;
  circuitry means connected to said electronic valving means for selectably applying a steady first blocking potential to said electronic valving means, including circuitry responsive to actuation of said initiation switch for removing said first blocking potential from said electronic valving means;
  further circuitry means connected to said electronic valving means for applying a second blocking potential to said electronic valving means and including time adjustable circuitry responsive to actuation of said initiating switch for removing said second blocking potential at a pre selectable time with respect to the waveform of said energy source means;
  whereby said electronic valving means is held firmly nonconductive until a predeterminable time after an actuation of said initiation switch and is then rendered conductive.

10. The device of claim 9, wherein the circuitry means removing the first blocking potential from said electronic valving means is time adjustable with respect to the cycles of said cyclical energy source means.

11. The device of claim 9, wherein the second blocking potential is a pulsing potential, said second blocking potential pulsing to effect alternative conditions of conduction and nonconduction of said electronic valving means.

12. In timing and heat control circuitry for initiating the flow of welding current to a welding transformer, the combination comprising:

valving means and energy source means applying cyclical potential to the principal electrodes of said valving means;

steady state means supplying a first blocking potential to said valving means for holding same in normally nonconductive condition;

pulsing means blocking conduction of said valving means for preventing conduction thereof during pulses;

means for changing said steady state blocking potential into a steady state conduction potential and for permitting said conduction potential to be applied to said valving means at the beginning of a sequence of operation and for returning same to said steady state blocking condition by the end of a predetermined number of cycles;

said pulsing blocking means being correlated with the applied cyclical potential and with said steady state conduction potential for permitting potential to effect conduction of said valving means at predetermined points on selected cycles of said applied source and cooperating with said steady state blocking potential for holding said valving means in a nonconductive condition upon the return of the principal electrodes to zero potential following completion of said predetermined number of cycles.

References Cited

UNITED STATES PATENTS 2,883,579    4/1959    Rockafellow      219—114
3,178,551    4/1965    Webb      219—114

JOHN W. HUCKERT, *Primary Examiner.*

R. SANDLER, *Assistant Examiner.*

U.S. Cl. X.R.

219—114, 136